(No Model.)  2 Sheets—Sheet 1.
E. WESTON.
SYSTEM FOR THE ELECTRICAL TRANSMISSION OF POWER.
No. 264,983.  Patented Sept. 26, 1882.
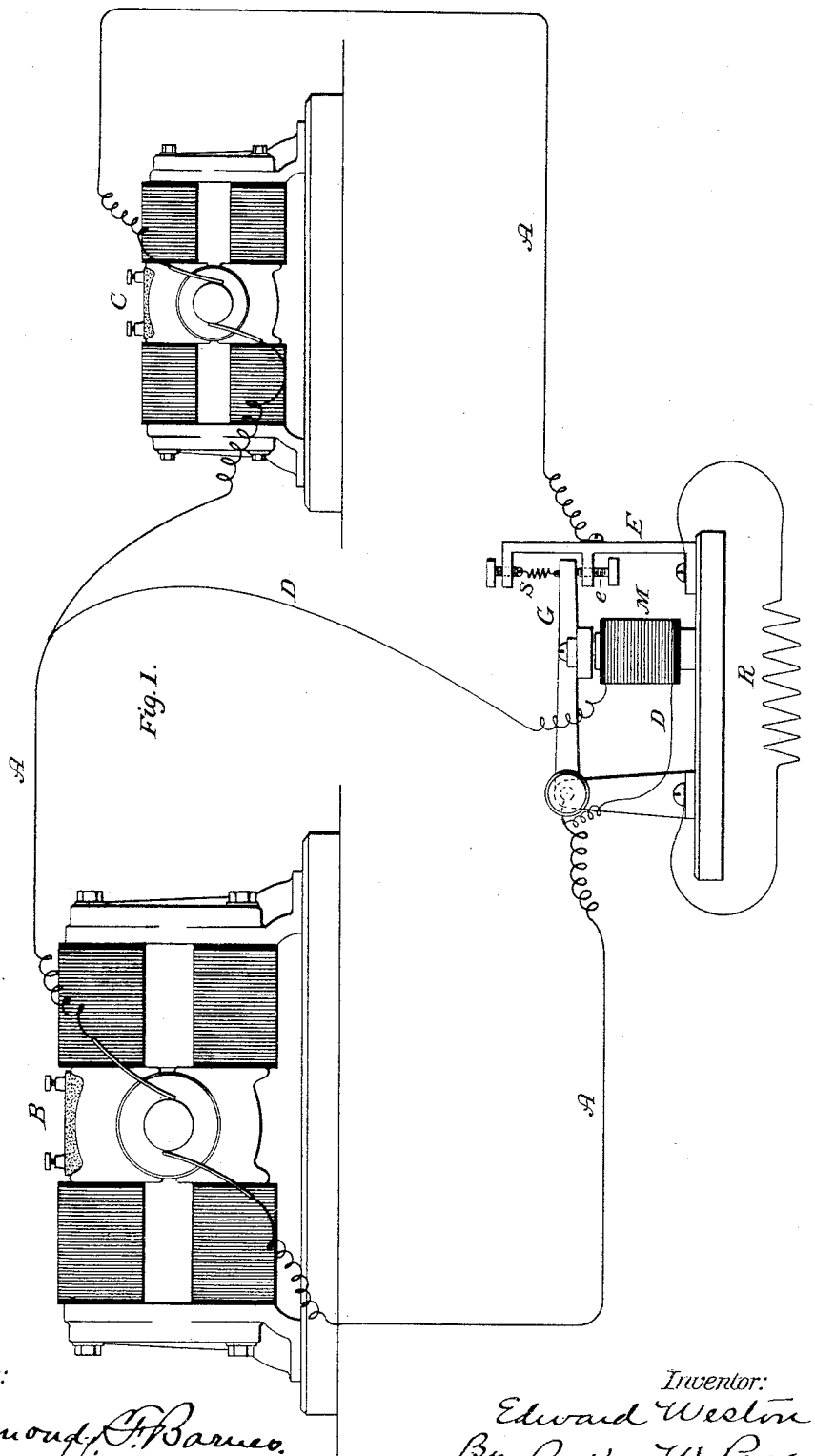
Attest:
Raymond F. Barnes.
Henry Hill.
Inventor:
Edward Weston
By Parker W. Page
atty.

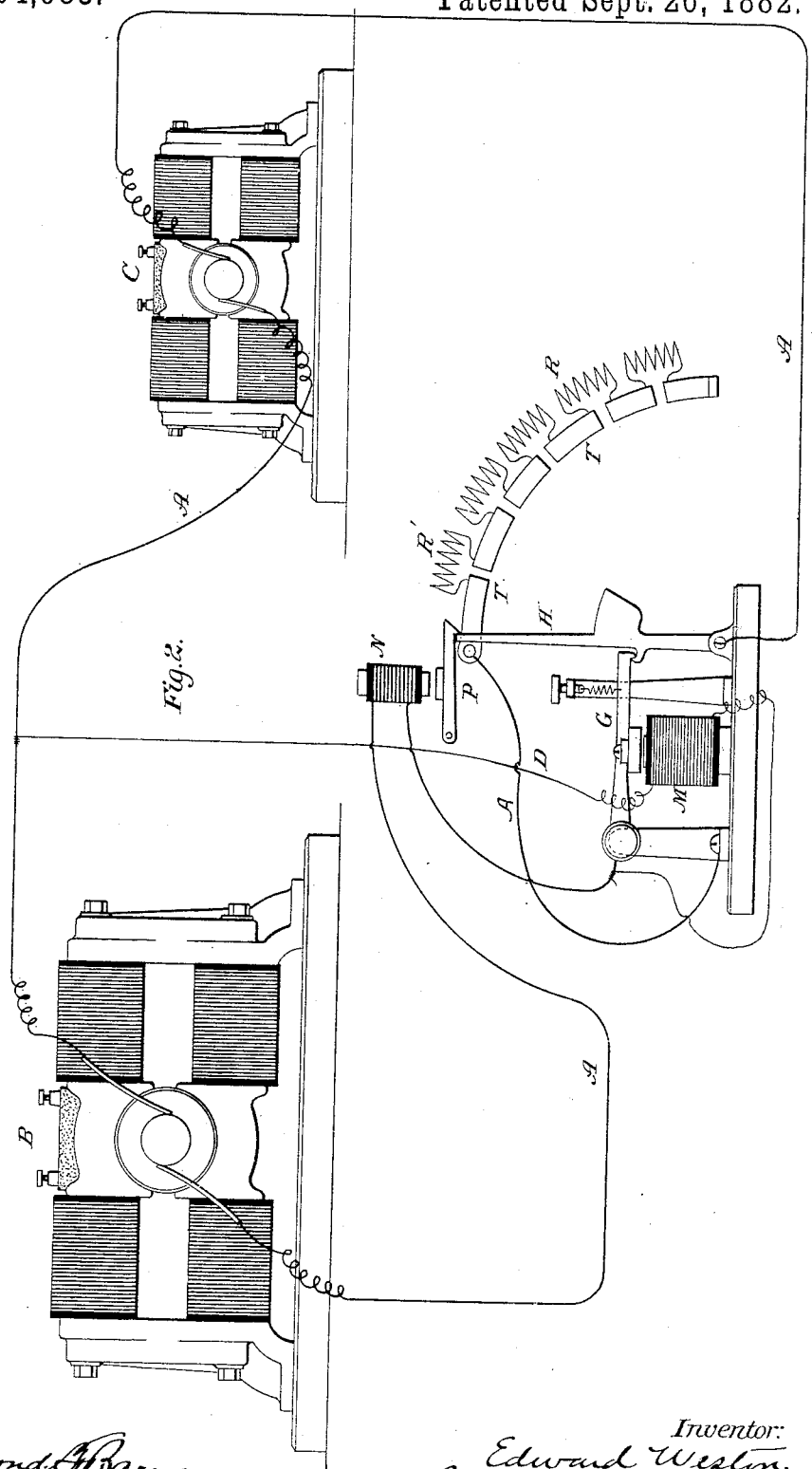

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

SYSTEM FOR THE ELECTRICAL TRANSMISSION OF POWER.

SPECIFICATION forming part of Letters Patent No. 264,983, dated September 26, 1882.

Application filed May 8, 1882. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Systems for the Electrical Transmission of Power, of which the following is a specification, reference being had to the drawings accompanying and forming a part of the same.

In an application for patent of even date herewith I have shown and described an apparatus for use with a circuit containing an electrical generator and an electro-magnetic motor, the said apparatus consisting substantially of a circuit-breaker included in the main line connecting the motor with the generator, and constructed or arranged to interrupt the continuity of the line upon a predetermined fall in the counter electro-motive force developed by the motor. In the case referred to the circuit-breaker, whatever its specific character, was included, as stated, in the main line, its normal action therefor being to preserve the continuity of the circuit until the current passing on the line exceeded the limit of adjustment, in which case the contact-points were positively separated by the action of the current.

The subject of my present application is an apparatus of a similar nature to that described, and designed for the same purpose—viz., to prevent, in a circuit including generators and motors, any injury to the latter by the heating effects of an abnormal flow of current. In lieu of being included in the main line, however, this apparatus is included in and arranged to be operated by a closed shunt or derived circuit around the motor, its action being to maintain the continuity of the motor-circuit as long as the motor is developing the proper degree of counter electro-motive force, but to interrupt said circuit, whether it be the direct circuit from a generator or a branch thereof, when the counter electro-motive force falls below a predetermined limit.

I will now describe my invention by reference to the drawings, in which—

Figure 1 represents a circuit containing a generator and a motor and a branch circuit including a circuit-breaker. Fig. 2 illustrates a modification of the same general arrangement, with the addition of a resistance cut-out and an electro-magnet in the main circuit, for a purpose hereinafter set forth.

Referring to Fig. 1, let A A designate any electric circuit containing a dynamo or magneto electric generator, B, and a motor, C. Between the two conductors of the circuit—or what is in effect the same thing, around the poles of the motor—let a branch or derived circuit, D, be formed.

M is an electro-magnet of high resistance included in this branch.

In face of the pole or poles of magnet M is a pivoted armature-lever, G, in the path of downward movement of which is a stop, $e$, in a standard, E, and a spring, S, connected with the armature-lever is used to determine its retractile force. The main-circuit conductor A is severed, one end being connected to lever G, the other to the stop $e$, and a fine wire, R, of very high resistance, forms a bridge between these two parts of the apparatus.

It will be seen from the foregoing that the main circuit is normally open, or practically so. Suppose, then, that the generator be started, the branch circuit D, forming at this time the path of least resistance for the current, will energize the magnet M sufficiently to draw down the armature-lever G onto stop $e$, thus closing the main or motor circuit. The motor, unless overloaded or prevented from turning freely, attains very rapidly a high rate of speed and develops a counter electro-motive force, which, operating as a resistance, directs sufficient current through branch D to keep the armature-lever G on stop $e$ and the motor-circuit closed. In this condition the parts remain so long as the counter electro-motive force does not fall below a limit predetermined by experiment. Should the motor be overloaded or its speed from any cause (assuming that the electro-motive force of the generator remains constant) be reduced beyond a certain point, the corresponding fall in the electro-motive force developed by it permits a greater amount of current to pass through its coils until the current in the branch D becomes insufficient to hold down the lever G against the adjusted tension of spring S. When this occurs the motor-circuit is broken, the formation of a spark between the lever G and stop *e* being prevented by the wire R.

In a modified form of this apparatus the resistance is dispensed with and a number of contact-plates, T, connected by resistance-coils R', arranged in a position where a weighted contact-arm, H, will sweep over them. Arm H is held in a vertical position by the armature-lever G, in which position it completes the motor-circuit, the first contact-plate of the series T being in electrical connection with one end of the line, the arm H with the other. On a fall of counter electro-motive force the lever G is retracted, allowing arm H to drop, which, in descending, sweeps over the contact-plates T, introducing a gradually-increasing resistance until it falls off from the last contact-plate or reaches a stop extending from the same. In this manner the circuit may gradually be broken or a sufficiently high resistance inserted to practically interrupt the flow of current. In order, however, that the arm H may not fall on the retraction of armature-lever G, due to a stoppage of the flow of current, a small magnet, N, in the main circuit, and a pivoted lever, P, carrying an armature, may be used in conjunction with the arm H, the lever being pivoted, provided with a catch for engaging the end of the arm. When the motor-circuit is closed the lever P will be drawn up, leaving arm H held only by lever G. Should the motor-circuit be interrupted, however, the lever P engages the arm H, preventing it from dropping, except in the case when, by reason of an abnormal flow of current through the motor-circuit A A, the magnet M has previously released the armature-lever G.

Though shown in the drawings as included in a derived circuit to a single motor in a circuit, it is evident that this apparatus may be employed with all the motors in a system in which a number are run in multiple arc from one or more generators. It will be understood, too, that it may be employed for the same purpose and in the same manner as the devices described in the application to which allusion is made above. For example, if every motor in a system of transmission and distribution of power should be accompanied by a device similar in principle and operation to this, responsibility for damage to motors could be made to rest with the subscribers, since it is impossible with this apparatus in circuit to injure a motor by overloading it or checking it, unless by tampering with the apparatus.

The specific details of the devices above described may obviously be in many ways varied. For example, in place of the magnet and armature-lever, helices and cores may be employed; or, in lieu of the magnet M, I may use an expansible wire included in the derived circuit and arranged to raise the lever G when cool, but to lower it into contact with stop *e* when sufficient current is flowing through the derived circuit to heat the wire.

These modifications, with many others, are, however, now well recognized in the art, and will not be further described.

Having now described my invention, what I claim as new, and desire to secure by Letters Patent, is—

1. The combination, with an electric circuit and a motor included therein, of a branch or derived circuit around said motor, and devices included in said derived circuit, and constructed or arranged to interrupt the main circuit upon a predetermined fall of the counter electro-motive force produced by the motor, as set forth.

2. The combination, with an electric circuit and a motor included therein, of a branch or derived circuit around the motor, an electro-magnet or its equivalent in the branch circuit, and circuit making and breaking mechanism in the main circuit adapted to be operated by the said magnet, and thereby maintain the main circuit complete until the counter electro-motive force developed by the motor has fallen below a predetermined limit, substantially as set forth.

3. The combination, with an electric circuit and motor included therein, of a branch or derived circuit around the motor, an electro-magnet in said branch, a circuit-breaker or resistance-switch connected with the main circuit and operated by said magnet, and a magnet in the main circuit, in conjunction with a pivoted catch for the purpose of preventing the movement of said circuit-breaker, as and for the purpose hereinbefore set forth.

4. The combination, with the conductors A A, of an electric circuit and a motor connected therewith, of branch circuit D, electro magnet M, pivoted armature-lever G, connected with the main circuit and constituting an adjustable circuit-breaker, substantially in the manner described.

In testimony whereof I have hereunto set my hand this 6th day of May, 1882.

EDWARD WESTON.

Witnesses:
HENRY A. BECKMEYER,
W. FRISBY.